Oct. 31, 1939.   W. F. MESINGER   2,178,079
BALANCED DOUBLE SEATED VALVE
Original Filed Dec. 30, 1932
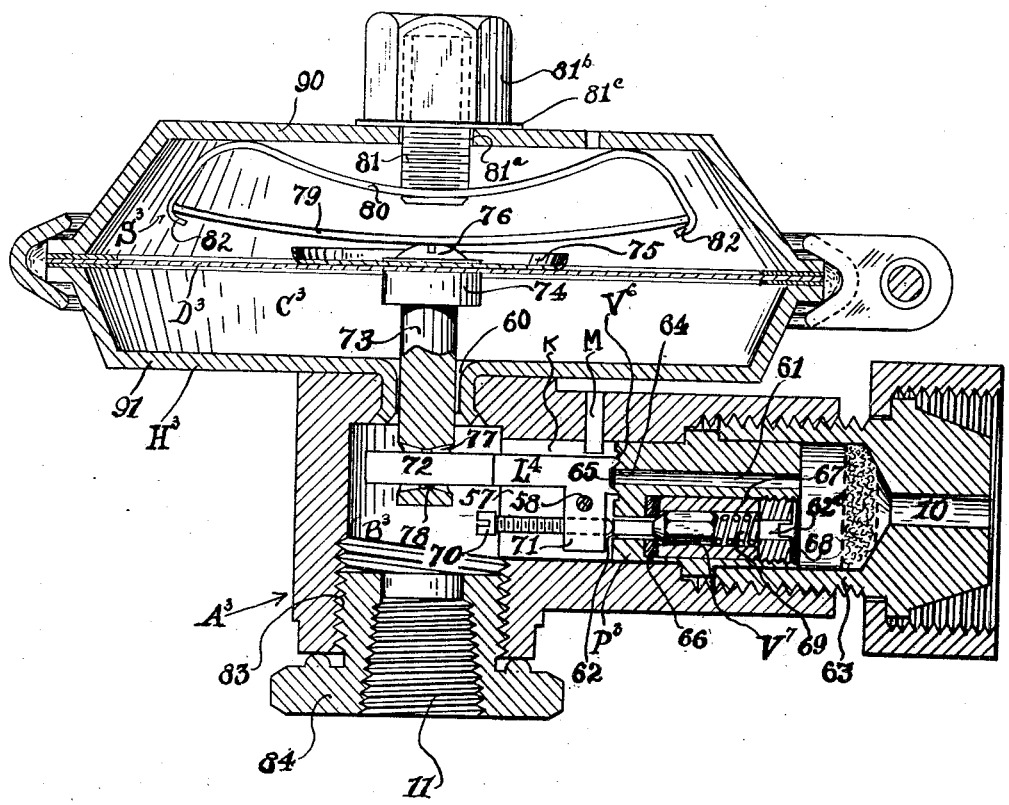
INVENTOR
WILLIAM F. MESINGER
BY
ATTORNEY Patented Oct. 31, 1939

2,178,079

UNITED STATES PATENT OFFICE 2,178,079

BALANCED DOUBLE SEATED VALVE

William F. Mesinger, Mount Vernon, N. Y., assignor to Oxweld Acetylene Company, a corporation of West Virginia Original application December 30, 1932, Serial No. 649,486, now Patent No. 2,119,471, dated May 31, 1938. Divided and this application October 30, 1937, Serial No. 171,901

3 Claims. (Cl. 277—20)

This invention relates to balanced double seated valves, and more particularly to their application to fluid pressure regulator mechanism.

This application is a division of my copending application Serial No. 649,486, filed December 30, 1932, and now Patent No. 2,119,471, granted May 31, 1938.

In regulators of this character for maintaining fluid pressure on the outlet side of a regulator valve constant, there is commonly provided, in a casing having a passage therethrough, pressure responsive means, as a diaphragm, under influence of pressure changes on the outlet side of a regulator valve in control of the flow of fluid through the passage; the diaphragm being so connected to the valve that it will be opened or closed according as and to an extent in proportion as the pressure in the outlet chamber of the regulator falls below or rises above a predetermined normal for which the regulator mechanism is adjusted. In order that this valve may be effectively operated to maintain the pressure in the outlet chamber at a substantially uniform value, all pressure influences extraneous to those in response to which the apparatus is designed to operate should be eliminated. It frequently occurs, however, with apparatus of this character, as heretofore constructed, that movements of the valve are influenced by pressures other than those exerted on the pressure responsive diaphragm, notably by variations in pressure on the intake side of the valve from that for which the mechanism is adjusted. Such influences cause an unbalanced operation of the valve with a resultant increase or decrease in the discharge pressure of the fluid from that for which the apparatus has been adjusted.

An important object of the invention is, therefore, to provide, in fluid pressure regulator apparatus of the above character, improved means for maintaining the pressure of fluid discharged from the outlet port of the regulator substantially uniform and means to this end whereby the regulatory operation of the control valve means of such apparatus will be uninfluenced in its operation by pressure variations from a predetermined normal on the intake side of the valve means.

Another object of the invention is to provide improved means to insure simultaneous seating of two valves, one opening with the pressure and the other opening against the pressure, by balancing the pressure on one of such valves against the pressure on the other valve.

In accordance with this invention, a regulator mechanism embodying this improvement may comprise a casing having a passage therethrough divided into inlet and outlet portions by a partition having a pair of ports therethrough for connecting the inlet and outlet portions of the passage, the ports being controlled by valves operating from opposite sides of the partition through pressure-responsive means, as a diaphragm, under influence of pressure variations from a predetermined normal in the outlet portion of the passage. The valves are preferably connected with the pressure responsive means by suitable linkage including lever means operating about an axis in the passage; the lever means being so connected with the valves that they will be operated thereby for simultaneously opening and closing the ports and so that the moments of pressure forces acting on the valves from the inlet side of the passage about the axis of the lever means will balance each other and thereby eliminate from the operations of the valves all influence of such pressure.

The above and other objects and the novel features of the invention will be made apparent from the following specifications taken with the accompanying drawing, in which the figure is a sectional view of a fluid pressure regulator constructed in accordance with this invention.

In the form of the invention shown in the drawing, there is provided a casing $A^3$ having a bore or passage $B^3$ therethrough and a diaphragm housing $H^3$ consisting of upper and lower dished members 90 and 91 between the peripheral edges of which the diaphragm $D^3$ is clamped and held within the diaphragm chamber $C^3$ provided by the two members when assembled, the chamber being connected through an opening 60 with the passage $B^3$. The passage $B^3$ is divided into inlet and outlet portions or chambers by a partition $P^3$, which is provided with ports 61 and 62 extending therethrough in an axial direction and connecting the inlet and outlet portions of the passage $B^3$. The partition $P^3$ is held in place by a plug 63 in the form of a nipple for connecting the apparatus to a source of fluid supply.

The plug 63 makes external threaded engagement with the right-hand portion of the passage $B^3$ and presses the partition $P^3$ to a gas-tight seat at the shoulder formed by the right-hand end of a restricted portion K of the passage $B^3$. The plug 63 has an axial passage 10 therethrough for admitting gas under pressure from a source of supply such as a gas tank, the end of the plug 63 being constructed for coupling to such tank or source of supply in the customary manner.

The partition P³ substantially fills the portion K of the passage B³ and is provided with a vertical kerf 57 that extends rightwardly to the ends of the ports 61 and 62 and a pin M for maintaining the kerf 57 in a vertical position passes tightly through the wall of the casing A₃ and extends a short distance into the kerf 57.

In the outlet portion of the passage B³ there is provided a lever L⁴ for operating a pair of valves V⁶ and V⁷, valve V⁶ being formed integrally with the lever and operating from the outlet side of the partition and valve V⁷ being in the nature of a needle valve operating from the inlet side thereof.

The lever L⁴ is of simple, one piece construction and is mounted in the outlet portion of passage B³, in which it is pivotally supported by a pin 58 extending transversely across the kerf 57 formed in the partition P³. Valve V⁶ is cup shaped to receive therein the end of a nozzle 64 formed on the partition P³ at the discharge end of passage 61 and in order to insure a fluid tight fit between the valve and the nozzle end, a thin layer of solder 65 or other suitable comparatively soft yielding material may be provided in the bottom of the cup. The thickness of the solder is shown considerably exaggerated in the drawing. The valve V⁷ is of the needle type and a seat 66 of yielding material is provided on the inlet side of the port controlled thereby held in place by a sleeve 67 and a screw plug 68 located in a counterbore 62a formed in the partition coaxial with the passage or port 62. The screw plug forms a closure for the bore at its rear end and is kerfed to facilitate assembly in the bore and apertured to permit passage of fluid therethrough. The valve V⁷ has a snug sliding fit in the bore of the sleeve 67 and is hexagonal in cross section or otherwise shaped to permit the passage of fluid therearound to the port 62. A helical spring 69 is provided between the plug and the rear end of the valve V⁷ to normally hold it yieldingly against its seat and the forward end of the valve is provided with a stem of smaller cross section than the port 62 which extends therethrough and into contact with the end of a set screw 70 adjustably threaded through a lateral arm 71 on lever L⁴.

The lever is also provided with a long arm 72 extending forwardly in the passage by means of which arm the lever is operated in its control movements through a pressure responsive member in the outlet portion of passage B³ as a diaphragm D³ located in the diaphragm chamber C³ and connected with the long arm of the lever through a stem 73, the upper end of the stem having an enlarged head 74, between which and a diaphragm plate 75, the center of the diaphragm D³ is clamped by means of a diaphragm screw 76. The lower end of this stem has an eye 77 formed therein for reception of the long arm 72 of the lever L⁴, the eye being enlarged outwardly toward the opposite surfaces of the stem and provided with an annular fulcrum 78 centrally and circumferentially thereof so as to afford a freely flexible connection between the stem and lever arm.

In order that the valves may be operated simultaneously for opening and closing, they are suitably arranged so that their lines of movement will be at equal distances on opposite sides of the pivotal axis of the lever L⁴ and in order that the effective pressures on the intake side of these valves may be balanced and of no effect on the regulator movements of the valves, the moments of force of such pressures about the pivotal axis 58 of the lever are made equal and, since they act in opposition to each other through the lever, neutralize each other as in the two forms of the invention disclosed in the parent application referred to.

In the regulator of the present invention, responsiveness of the diaphragm D³ is adjustable through a compensating spring combination S³ provided on the upper side of the diaphragm and comprising a leaf spring 79 connected at its ends to another leaf spring 80 bowed downwardly at an intermediate point into contact with the head of the diaphragm screw 76. The pressure with which this spring combination S³ resists the pressure on the diaphragm D from the underside thereof may be adjusted through a regulator screw 81 extending through an aperture 81a in the top of the diaphragm housing H³ and riveted to the center of spring 80. The screw is threaded at its upper end into the bore of a cap 81b which rests upon a washer 81c on top of the housing so that by turning the cap the screw will be retracted into or extended from the said bore. The spring 80 is bowed downwardly intermediately of its ends and rests at the ends of the bowed portion against the top of the housing H³ from which points the spring is again bent downwardly and outwardly at an angle and then turned inwardly to form seats 82 for the ends of the spring 79.

With this construction the contact points of the spring 80 with the housing act as fulcrums and as a consequence, an upward pull by the screw 81 tending to straighten the central curved portion of spring 80 will cause the ends thereof beyond the fulcrum points to press inwardly against the ends of the spring 79, thereby increasing the pressure of the latter against the diaphragm, and movement of the screw 81 in the opposite direction will, of course, decrease the pressure.

In operation, the valves V⁶ and V⁷ may be adjusted to the desired position relative to their seats for admitting fluid at the desired pressure to the outlet side thereof by adjustment of the spring combination S³ through the screw 81 and, when the springs are properly adjusted to the pressure which it is desired to maintain, the valves will operate as in the other forms of the invention hereinbefore described.

These adjustments may be made with the partition P³ in place or prior to assembly with the casing and to the end that adjustment may be made after assembly, the opening 83 in which the closure plug 84 therefor is located may be of sufficient size to permit access to the passage. This plug may be bored centrally to provide the outlet port 11 for the passage B³.

It is to be understood that the embodiment of the invention as herein set forth is to be considered as illustrative of and to in no way limit the invention to the construction herein disclosed. It is also to be understood that the balanced valve construction has wider application than to the fluid pressure regulators herein set forth.

I claim:

1. The combination of a casing having a passage therethrough; ports in the passage; a lever in the outlet portion of the passage pivotally supported for operation therein; a valve secured to said lever and operated thereby in controlling one of the ports; a second valve free of positive connection with said lever and operating in opposite direction to the first valve for controlling the other port; said lever having a lateral arm rigidly connected therewith; and means adjustably extending from said arm and contacting with the second valve for operating the same under influence of movements of the lever simultaneously with the operation of the first valve.

2. The combination of a casing having a passage therethrough; ports in the passage; a lever in the passage pivotally supported for operation therein; a valve secured to said lever and operated thereby in controlling one of the ports; a second valve free of positive connection with the lever and operating in opposite direction to the first valve for controlling the other port; said lever having a lateral arm; a set screw extending adjustably through said arm and contacting with the second valve for operating the same under influence of movements of the lever simultaneously with the operation of the first valve; and means yieldably pressing said second valve toward closed position.

3. The combination of a casing having a passage therethrough; ports in the passage; a lever in the passage pivotally supported for operation therein; a valve secured to said lever and operated thereby in controlling one of the ports; a nozzle at the outlet end of said controlled port, said valve having a recess for reception of the end of said nozzle; and a second valve operating in opposite direction to the first valve for controlling the other port; said valves being connected to said lever by means effecting simultaneous opening and simultaneous closing of said valves under control of the operations of said lever.

WILLIAM F. MESINGER.